United States Patent
Dow et al.

(10) Patent No.: US 6,268,598 B1
(45) Date of Patent: Jul. 31, 2001

(54) HAND-HELD SCANNER APPARATUS HAVING VISUAL SCAN-REGION POSITION FEEDBACK SYSTEM

(75) Inventors: James C Dow, Ft Collins; David J Sims, Fort Collins; Thomas E Berg, Ft Collins, all of CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/417,602

(22) Filed: Oct. 14, 1999

(51) Int. Cl.[7] ............................. H01L 27/00; H04N 1/024
(52) U.S. Cl. ........................................ 250/208.1; 358/474
(58) Field of Search ...................... 250/208.1; 358/473, 358/474, 493, 494; 235/462.45, 472.01

(56) References Cited

U.S. PATENT DOCUMENTS

| | | | |
|---|---|---|---|
| 3,818,216 | 6/1974 | Larraburu | 240/41.3 |
| 4,517,631 | 5/1985 | Mullins | 362/346 |
| 4,899,228 | * 2/1990 | Sano et al. | 358/473 |
| 5,523,562 | 6/1996 | Maple | 250/208.3 |
| 5,632,551 | 5/1997 | Roney et al. | 362/249 |
| 5,865,528 | 2/1999 | Compton et al. | 362/300 |
| 6,002,124 | 12/1999 | Bohn et al. | 250/208.1 |
| 6,043,503 | * 3/2000 | Dow et al. | 250/208.1 |
| 6,118,553 | * 9/2000 | Berg | 358/473 |
| 6,184,515 | * 2/2001 | Bohn | 250/208.1 |

* cited by examiner

Primary Examiner—Stephone B. Allen (57) ABSTRACT

Scanner apparatus having a visual scan-region position feedback system according to the present invention may comprise a body having at least one elongate opening therein that extends along a transverse axis so that the elongate opening encompasses a scan region on an object during a scanning operation. An image sensing system mounted within the body of the scanner is optically coupled to the elongate opening therein and receives image light reflected by the scan region. A first light source mounted to the body produces a first light beam that is generally aligned with the elongate opening in the body and that extends outwardly from the body in a first direction along the transverse axis. The first light beam is incident on at least a portion of the object being scanned during the scanning operation and provides a visual indication of a position of the scan region with respect to the object being scanned.

20 Claims, 4 Drawing Sheets

HAND-HELD SCANNER APPARATUS HAVING VISUAL SCAN-REGION POSITION FEEDBACK SYSTEM

FIELD OF THE INVENTION

This invention relates to hand-held imaging devices in general and more specifically to a hand-held imaging device having improved user feedback of scan region position.

BACKGROUND

Optical scanner devices are well-known in the art and may be used to produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer. A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation is complete by any convenient means, such as via a cable or an optical infrared data link.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a plurality of light emitting diodes (LEDs), although other types of light sources, such as fluorescent or incandescent lamps, may also be used. The optical system may include a "contact image sensor" or CIS to focus the image of the illuminated scan line onto the surface of the detector. Alternatively, a lens and/or mirror assembly may be used to collect and focus light from the illuminated scan region onto the detector.

The photosensitive detector used to detect the image light focused thereon by the optical system typically comprises a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the object being scanned or it may be transmitted through the object. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

The hand-held scanner device may be provided with a position sensing or "navigation" system in order to determine the position of the hand-held scanner with respect to the object being scanned. Accordingly, such a position sensing system allows the scanner to correlate its position with respect to the object being scanned. The position correlation allows a complete image of the scanned object to be produced even though the scanner may not scan the entire object during a single pass or "swipe." For example, if two or more swipes of the object are required to scan the entire object, then the position correlation provided by the navigation system will allow the various portions of the scanned image data to be "stitched" together to form a single unitary image representative of the entire scanned object.

One type of navigation system utilizes a pair of optical sensors to detect certain inherent structural features (e.g., surface roughness, paper fiber orientation, etc.) contained on the object being scanned (e.g., a sheet of paper with text or images thereon). Examples of the foregoing type of navigation system are disclosed in U.S. Pat. No. 5,089,712 of Holland for "Sheet Advancement Control System Detecting Fiber Pattern of Sheet," and U.S. Pat. No. 5,578,813 of Allen, et al., for "Freehand Image Scanning Device which Compensates for Non-Linear Movement," both of which are specifically incorporated herein by reference for all that they disclose.

One problem associated with many hand-held scanners relates to the ability of the user to keep track of the position of the scan line with respect to the body of the scanner. That is, since the aperture in the image head of the scanner is not visible to the user during scanning, it is often difficult for the user to remember precisely the location of the scan line. If the user's recollection is incorrect, he or she may fail to capture an image of the entire object or document being scanned. If so, the user will need to re-scan the entire object.

SUMMARY OF THE INVENTION

Scanner apparatus having a visual scan-region position feedback system according to the present invention may comprise a body having at least one elongate opening therein that extends along a transverse axis so that the elongate opening encompasses a scan region on an object during a scanning operation. An image sensing system mounted within the body of the scanner is optically coupled to the elongate opening therein and receives image light reflected by the scan region. A first light source mounted to the body produces a first light beam that is generally aligned with the elongate opening in the body and that extends outwardly from the body in a first direction along the transverse axis. The first light beam is incident on at least a portion of the object being scanned during the scanning operation and provides a visual indication of a position of the scan region with respect to the object being scanned.

Also disclosed is a method of scanning an object that comprises the steps of: Providing a scanner apparatus having an elongate opening therein that extends along a transverse direction; placing the scanner apparatus in contact with at least a portion of the object to be scanned so that the elongate opening in the scanner apparatus encompasses a scan region; and generating a first light beam that is generally aligned with the elongate opening in the scanner apparatus and that extends outwardly from the scanner body along the transverse direction so that the first light beam is incident on at least a portion of the object being scanned.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
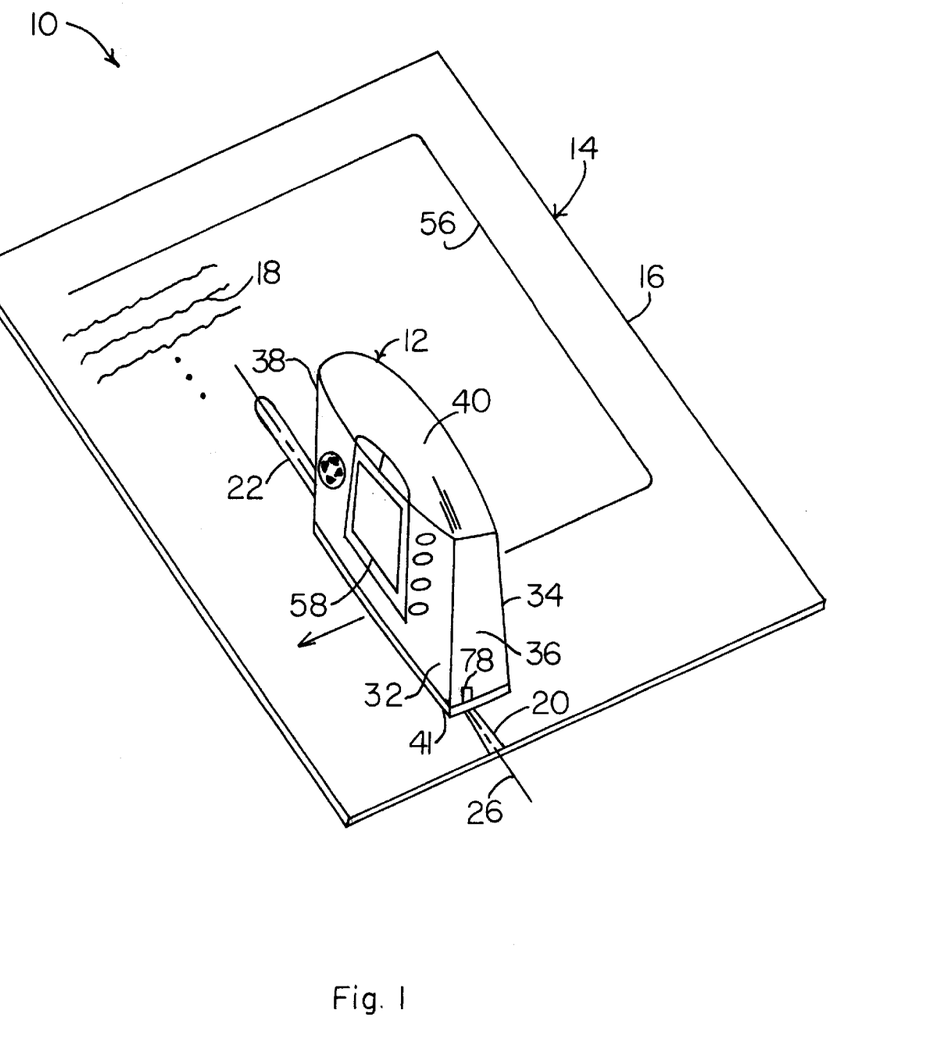
FIG. 1 is a perspective view of a scanner apparatus having a visual scan-region position feedback system according to the present invention showing the feedback light beams that extend from either end panel of the scanner body.

The visual scan-region position feedback system 10 according to the present invention is shown in FIG. 1 as it could be used on a hand-held or portable scanner apparatus 12 to scan an object 14 such as a document 16 with written text 18 provided thereon. In the embodiment shown and described herein, the visual scan-region position feedback system 10 produces first and second feedback light beams 20 and 22 that are generally aligned with an elongate opening 24 (FIG. 2) provided on the scan head or contact face 42 of scanner 12 and that extend outwardly from the end panels 36, 38 of the scanner 12 along a transverse axis 26. The first and second light beams 20 and 22 illuminate portions of the object 14 being scanned, thereby allowing a user (not shown) to more easily ascertain the position of the scan-region 28 (FIGS. 3 and 4) with respect to the object 14.

The scanner apparatus 12 may be provided with a body 30 having an overall configuration or shape that is conducive to hand manipulation by the user (not shown), although this is not required. For example, in the embodiment shown and described herein, the body 30 of scanner 12 may comprise front and rear panels 32 and 34 which are held in spaced-apart relation by a pair of end panels 36 and 38. A curved top portion 40 joins together the front and rear panels 32 and 34 as well as the end panels 36 and 38 to form a generally rectangularly shaped structure as best seen in FIG. 1. The bottom portion 41 of the body 30 of scanner 12 may comprise a contact face or scan head 42 (FIG. 2) that is configured to contact the object 14 being scanned.

Figure 2:
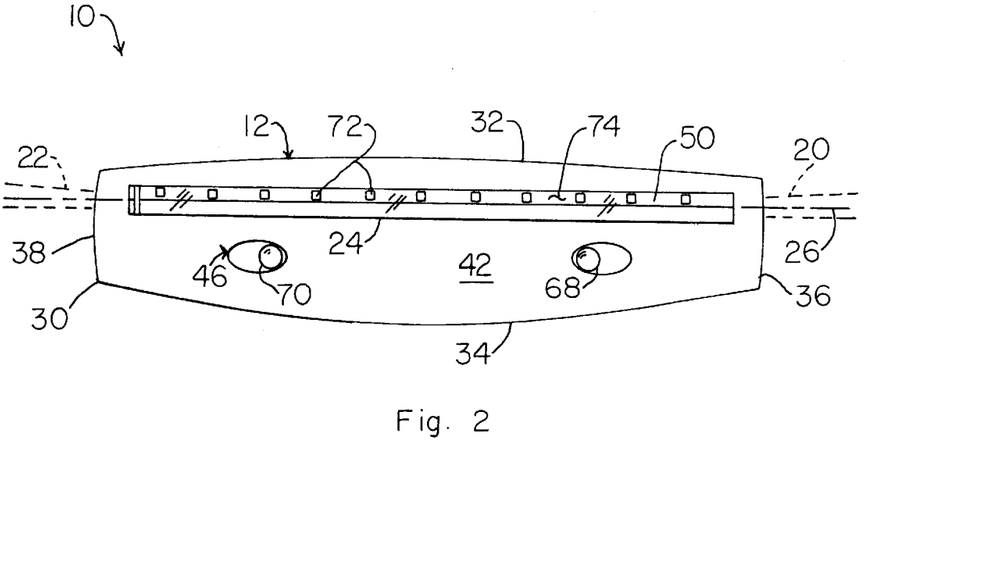
FIG. 2 is a plan view of a contact face of the body of the scanner showing the elongate opening therein and the positions and orientations of the feedback light beams that extend outwardly from the end panels.

The contact face or scan head 42 of the body 30 of scanner 12 is best seen in FIG. 2 and may comprise a generally flat or planar surface having an elongate opening 24 provided therein that extends generally along transverse axis 26. As will be described in greater detail below, the elongate opening 24 defines a generally rectangularly shaped scan-region 28 (FIGS. 3 and 4) of substantially the same dimensions when the contact face 42 of scanner 12 is placed in contact with the object 14 that is to be scanned.

Figure 3:
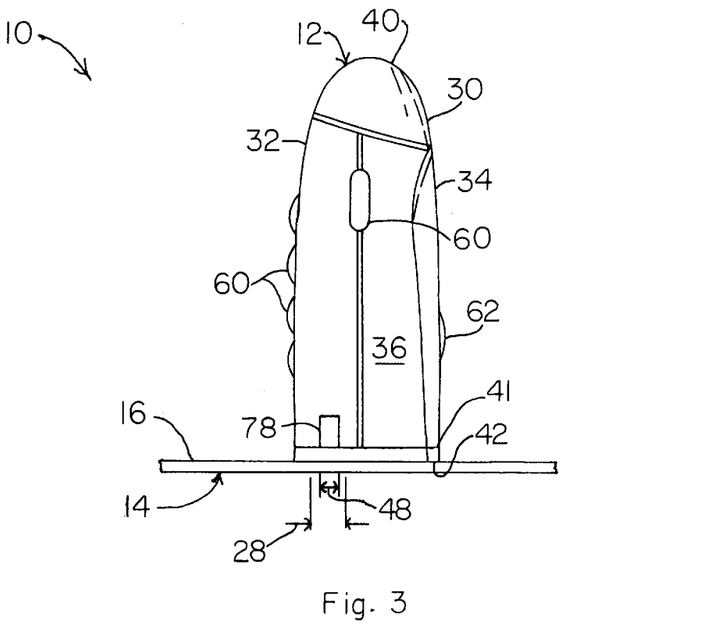
FIG. 3 is a side view in elevation of the body of the scanner showing the position of the light beam aperture in the end panel of the body relative to the scan region and scan line.
Figure 4:
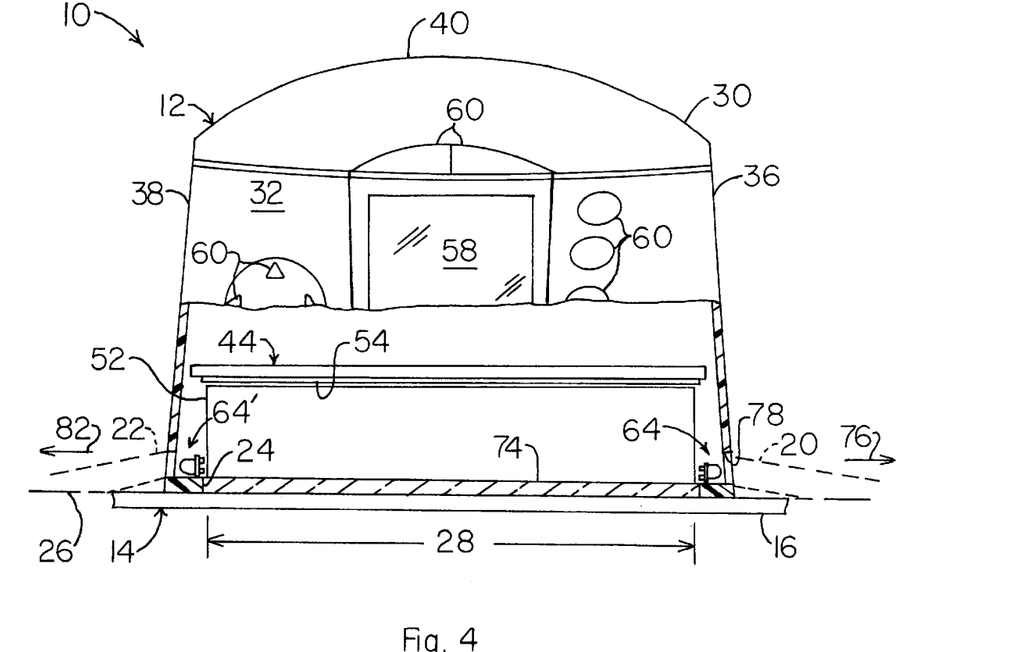
FIG. 4 is a front view in elevation of the scanner according to the present invention with a portion of the body broken away to show the internal configuration of the light source assemblies for producing the feedback light beams.

With reference now to FIGS. 1, 3, and 4, the body 30 of scanner 12 may also be provided with a display device, such as a liquid crystal display 58, for displaying data relating to the function and operation of the hand-held scanner 12. One or more function buttons or switches 60 also may be provided at various locations on the body 30 to control the function and operation of the hand-held scanner 12. The rear panel 34 of scanner 12 may be provided with a start/stop scan button or bar 62 (FIG. 3) to allow the user to initiate and terminate the scan operation. The electrical power required to operate the hand-held scanner may be provided by a suitable electrical power source, such as a battery (not shown), that may be mounted at a suitable location within the main body 30 of scanner 12.

In addition to the external features described above, the body 30 of scanner 12 may be sized to receive the various electronic components and systems required for the operation of the hand-held scanner 12. For example, the main body 30 may be sized to receive an image sensing system 44 and a navigation system 46, as best seen in FIGS. 2 and 4. The image sensing system 44 produces an image data signal (not shown) that is representative of a scan line 48 (the width of which is illustrated in FIG. 3) on the object 14 being scanned. In one preferred embodiment, the image sensing system 44 may also be provided with an illumination system 50 for directing light (not shown) onto the object 14. The light from the illumination system 50 passes through the elongate opening 24 provided in the contact face 42 of body 30 and thereafter illuminates the scan region 28 on the object 14. An optical system 52 (FIG. 4) associated with the image sensing system 44 directs onto the surface of a detector array 54 image light (not shown) reflected by the illuminated scan region 28 on the object 14. The detector array 54 produces the image data signal (not shown) which is representative of the scan line 48 contained within the illuminated scan region 28.

It is generally preferred, but not required, that the hand-held image scanner apparatus 12 be provided with a navigation system 46 (FIG. 2) which produces at least one navigation data signal (not shown) that is indicative of the position of the hand-held scanner 12 with respect to the object 14 being scanned. The navigation system 46 allows the image scanner 12 to scan objects of nearly any size regardless of the size of the portable or hand-held image scanner apparatus 12. For example, in the application illustrated in FIG. 1, the entire document 16 may be scanned by moving the portable image scanner 10 over the document 16 along a meandering scanning path 56. The meandering scanning path 56 may be thought of as defining one or more scanning passes or "swipes." Image data representative of the entirety of the object 14 may then be obtained by stitching together the various image data pieces acquired by the scanner 12 during each swipe of the object 14. The various image data pieces may be stitched together based on position or navigation information provided by the navigation system 46.

Figure 5:
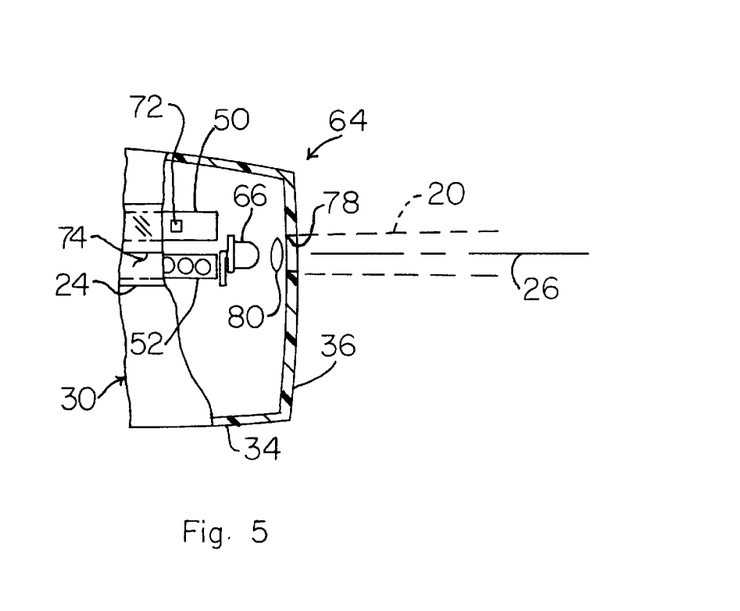
FIG. 5 is an enlarged plan view of a portion of the bottom face of the body of the scanner illustrated in FIG. 4 showing the positions of the light source and collimating lens.

The various components of the visual scan region position feedback system 10 which produces the feedback light beams 20 and 22 are best seen in FIGS. 4 and 5. The first and second feedback light beams 20 and 22 may be produced by corresponding light source assemblies 64 and 64', which, in one preferred embodiment, may be substantially identical to one another. Alternatively, other arrangements may be used to produce the two feedback light beams 20 and 22, as will be described in greater detail below. Briefly, the light source assembly 64 may comprise a light source 66 mounted within the body 30 of scanner 12 so that light produced by the light source 66 emerges from the body 30 as a first feedback light beam 20. The first feedback light beam 20 is generally aligned with the elongate opening 24 provided in the contact face 42 of body 30 and extends outward from the body 30 in a first direction along the transverse axis 26. See FIGS. 1, 4, and 5. The arrangement of the light source assembly 64 is such that the first light beam 20 produced thereby is incident on at least a portion of the object 14 during a scanning operation, thereby providing the user with a visual indication of the position of the scan region 24 with respect to the object 14. See FIG. 1. As mentioned above, a second light beam 22 may be produced by a substantially identical light source assembly (e.g., light source assembly 64). A portion of the second light beam 22 is also incident on at least a portion of the object 14 during the scanning operation.

In order to scan the object 14 (e.g., a document 16 with written text 18 provided thereon), the user (not shown) may first position the scanner apparatus 12 on the document 16 so that the scan head 42 contacts the document 16. Since the scan head 42 is in contact with the document 16, the elongate opening 24 provided therein defines a scan-region 28 (FIGS. 3 and 4) on the document 16 that is substantially the same size and shape as the elongate opening 24. After making the appropriate selections with the function buttons 60, the user may initiate the scanning process by pressing the start/stop bar 62 (FIG. 3) provided on the rear panel 34 of scanner 12 and by thereafter sweeping the scanner 12 across the document 16 along the meandering scanning path 56, as best seen in FIG. 1. During the scan operation, the light source assemblies 64 are activated and produce the first and second feedback light beams 20 and 22. Since the elongate opening 24 that defines the scan region 28 is in contact with the object 14 during the scanning operation, it is not possible for the user to readily directly ascertain the position of the scan region 28 with respect to the object 14. However, the two light beams 20 and 22 provided by the visual scan region position feedback system 10 provide the user with a ready visual indication of the location of the transverse axis 26 which contains the scan region 28, thereby allowing the user to deduce the position of the scan region 28 relative to the object 14.

A significant advantage of the present invention is that it provides the user with a means for readily determining the position of the scan region 28 during the scanning operation to ensure that the user will scan all desired portions of the object 14. Consequently, the user will not be faced with the disappointing circumstance of performing a scan only to discover that some desired portion of the object was not captured during the scan. Another advantage of the present invention is that since the first and second light beams 20 and 22 extend from both sides of the scanner 12 for some distance along the transverse axis 26, it is much easier for the user to ascertain the position of the scan region 28 at all times during the scan region, even though the hand or arm of the user may temporarily block the user's view of one or the other end panels 36, 38 of the scanner 12 during the scan operation. Consequently, the present invention represents a significant improvement over an arrangement whereby the user may simply rely on a mark or other indication provided on the scanner body to indicate the approximate position of the scan region 28.

Having briefly described the visual scan region position feedback system 10 according to the present invention, as well as some of its more significant features and advantages, the various embodiments of the visual scan region position feedback system according to the present invention will now be described in detail. However, before proceeding with the description, it should be noted that while the visual scan region position feedback system 10 is shown and described herein as it may be utilized in one particular type of hand-held scanner 12 to scan one particular type of object 14 (e.g., a document 16 with written text 18 thereon), the present invention should not be regarded as limited to use with any particular type of scanner 12 or to any particular type of object 14. Indeed, the visual scan region position feedback system 10 may be utilized in any type of hand-held scanner that is now known in the art or that may be developed in the future and to scan almost any type of object imaginable. Also, it is possible to move the hand-held image scanner 12 over the object 14 being scanned in essentially an infinite number of varying meandering or curvilinear scanning paths. Consequently, the present invention should not be regarded as limited to being moved over the particular meandering scanning path 56 shown and described herein.

With the foregoing considerations in mind, one embodiment of a visual scan region position feedback system 10 is shown and described herein as it may be utilized in a portable or hand-held scanner 12. The scanner 12 may be used to scan an object 14, such as a document 16 with written text 18 provided thereon. As was mentioned above, it is generally preferred, but not required, that the hand-held scanner 12 be provided with a navigation system 46 (FIG. 3) which produces a navigation signal (not shown) indicative of the position of the hand-held image scanner 12 with respect to the object 14 being scanned. The navigation system 46 allows the hand-held image scanner 12 to scan an object 14 of nearly any size by merely moving the scanner 12 along a meandering or curvilinear scanning path 56 so that the scanner 12 passes over substantially the entirety of the portion of the object 14 that is to be scanned. The meandering path 56 may be thought of as defining a plurality of scanning "swipes." Image data (not shown) collected by the hand-held image scanner 12 during each of the scanning swipes thereafter may be stitched together by an image processor (not shown) with the aid of navigation data provided by the navigation system 46 to provide image data representative of the entirety of the scanned object 14.

The main body 30 of scanner 12 may comprise an overall configuration or shape that is conducive to hand manipulation by a user (not shown), although other shapes and configurations may also be used. By way of example, in one embodiment, the main body 30 may include front and rear panels 32 and 34, respectively, both of which extend generally in the transverse and vertical directions, thus define generally planar surfaces (although they may be curved along one or more axes) that may be referred to herein in the alternative as the front and back sides, respectively, of scanner 12. The front and back sides 32 and 34 are separated by first and second end panels or surfaces 36 and 38. In the embodiment shown and described herein, the front and rear sides 32 and 34 as well as the first and second end panels 36 and 38 merge smoothly together, forming a curved top portion 40, as best seen in FIGS. 1 and 3. Alternatively, other configurations are possible and the present invention should not be regarded as limited to a main body portion 30 having the particular shape or configuration shown and described herein.

The main body 30 may be made from any of a wide variety of materials, such as metals, plastics, or composite materials, suitable for the intended application. Accordingly, the present invention should not be regarded as limited to a main body portion 30 comprising any particular material. However, by way of example, in one preferred embodiment, the main body portion 30 of scanner 12 may comprise an injection molded plastic material (e.g., a polycarbonate plastic) reinforced with about 20% by weight glass fibers, although the presence of a reinforcing material is not required. Alternatively, other materials may also be used, as would be obvious to persons having ordinary skill in the art after having become familiar with the teachings of the present invention.

In addition to the external features described above, the main body portion 30 of hand-held image scanner 12 may be sized to receive the various electronic components and systems required for the operation of the hand-held image scanner apparatus 12. For example, the main body 30 may be sized to receive an image processing system (not shown) such as, for example, a microprocessor and associated random access memory (RAM), read-only memory (ROM), and mass data storage system (not shown), as well as any other devices or systems that may be required or desired for the operation of the scanner 12. Alternatively, some or all of the various electronic components may be located elsewhere and may be connected to the main body portion 30 by a suitable data link (not shown). The main body portion 30 may also be provided with a display system 58, such as a liquid crystal display (LCD), and various switching devices 60 that may be required or desired for the operation of the hand-held image scanner 12. The main body 30 of scanner 12 may also be provided with a start/stop switch or bar 62 which, in one preferred embodiment, may be located on the rear surface 34 of body 30. Alternatively, the various switching devices 60 and 62 may be located at other positions on the hand-held image scanner 12. The electrical power required to operate the scanner 12 may be provided by a suitable electrical power source, such as a battery (not shown), that may also be contained within the main body portion 30 of image scanner 12. However, since the various electronic components, display devices, and batteries that may be required or desired for use in a particular hand-held image scanner are well-known in the art and since descriptions of the various components are not required to understand or practice the present invention, the various components (e.g., electronic components (not shown), display device 58, switching devices 60 and 62, etc., utilized in one preferred embodiment of the present invention will not be described in further detail herein.

The bottom 41 of main body 30 may include a generally flat contact face or scan head portion 42 that is designed to be placed in contact with the object 14 to be scanned. See FIGS. 3 and 4. The contact face 42 of body 30 may be provided with an elongate opening 24 therein which defines a scan region 28. Scan region 28 generally corresponds to the size and shape of the elongate opening 24 when the contact face 42 of scanner 12 is placed against the object 14 to be scanned. The elongate opening 24 extends generally along the transverse axis 26. It is preferred, but not required, that the elongate opening 24 be covered with a suitable transparent material, such as glass 74, to prevent foreign objects and materials from entering the interior of body 30. The contact face 42 of main body 30 may also contain one or more navigation sensor openings 68 and 70 for use by the navigation system 46, as will be described below.

The scan head or contact face 42 of body 30 may be configured to receive an image sensing system 44 and a navigation system 46, as best seen in FIGS. 2 and 4. The image sensing system 44 produces an image signal (not shown) that is representative of a scan line 48 contained within the illuminated scan region 28 on the object 14 being scanned. In one preferred embodiment, the image sensing system 44 may comprise an illumination system 50 for directing light (not shown) onto the object 14. The light passes through the elongate opening 24 (FIG. 2), provided in the contact face 42 of body 30. The elongate opening 24 allows the light from the illumination system 50 to illuminate the scan region 28 on the object 14. An optical system 52 directs image light (not shown) reflected by the illuminated scan region 28 on the object 14 to a detector array 54. The detector array 54 produces the image data signal (not shown) which is representative of the image light (i.e., the scan line 48).

The various components of the image sensing system 44 may comprise any of a wide range of components and devices that are well-known in the art. For example, in one preferred embodiment, the illumination system 50 may comprise an array of light emitting diodes (LEDs) 72 (FIG. 2) which produce light of a brightness to sufficiently illuminate the scan region 28 on the object 14. Alternatively, other types of light sources, such as incandescent or fluorescent light sources, could also be used. It is preferred, but not required, that the optical system 52 used to direct and focus the image light (not shown) onto the surface of the detector array 54 comprise a contact image sensor, such as a contact image sensor of the type sold under the trademark "SELFOC" which is a registered trademark of the Nippon Sheet Glass Company, Limited. Briefly, a SELFOC lens array comprises a plurality of short, light transmitting rods positioned adjacent one another. The rods are "doped" so that the index of refraction of each rod varies radially across the rod. Accordingly, each rod is capable of focusing the image light onto the detector array 54 without the need for a separate focusing lens. In an alternative embodiment, other types of optical systems, such as projection imaging systems, that are now known in the art or that may be developed in the future, could also be used. The detector array 54 may comprise a CCD array having a resolution of 300 ppi (pixels per inch), such as type TS105, available from Texas Instruments, Inc., of Austin, Tex. Alternatively, other types of detectors having other resolutions could also be used.

The navigation system 46 may also be housed within the scan head or contact face portion 42 of housing 30. In one preferred embodiment, the navigation system 46 may comprise a navigation system of the type shown and described in U.S. patent application Ser. No. 09/045,603 (now U.S. Pat. No. 6,002,124 filed Mar. 20, 1998 and entitled "Portable Image Scanner with Optical Position Sensors" which is incorporated herein by reference for all that it discloses. Alternatively, the navigation system 46 may comprise a navigation system of the type shown and described in U.S. Pat. Nos. 5,089,712 of Holland, entitled "Sheet Advancement Control System Detecting Fiber Pattern of Sheet" and U.S. Pat No. 5,578,813, of Allen et al., entitled "Freehand Imaging Scanning Device which Compensates for Non-Linear Movement," both of which are specifically incorporated herein by reference for all that they disclose. Briefly, the navigation system 46 may comprise first and second navigation sensors (not shown) which view or monitor corresponding first and second navigation areas (also not shown) on the object 14 via respective first and second navigation sensor openings 68 and 70 (FIG. 2). The navigation system 46 detects inherent structural features on the object being scanned and is thereby able to keep track of the position of the scanner 12 as it is moved along the object 14. Since the navigation system 46 and methods for detecting and processing navigation data relating to the inherent structural features contained on the object 14 being scanned are described in great detail in the U.S. patent application and issued U.S. Patents referred to above, and since the details associated with the navigation system 46 are not required to understand or practice the present invention, the navigation system 46 and methods for detecting and processing navigation data that may be used in one preferred embodiment of the present invention will not be described in greater detail herein.

Referring now to FIGS. 4 and 5, the first and second light beams 20 and 22 may be produced by corresponding light source assemblies 64, 64' which may be substantially identical to one another. Light source assembly 64 may comprise a light source 66 mounted within the body 30 of scanner 12 so that the light produced thereby emerges from a first aperture 78 provided in the body 30 as the first feedback light beam 20. As was mentioned above, the first feedback light beam 20 is generally aligned with the elongate opening 24 provided in the contact face 42 of body 30 and extends in a first direction (indicated by arrow 76) along the transverse axis 26, as best seen in FIGS. 1, 2, 4, and 5. The first feedback light beam 20 should also be pointed slightly downward (i.e., toward the object 14 being scanned), as illustrated in FIG. 4, so that the light beam 20 is incident on at least a portion of the object 14 during a scanning operation.

The light source 66 may comprise any of a wide range of lamps and light sources (such as incandescent lamps or light emitting diodes (LEDs)) that are well-known in the art and that are readily commercially available. For example, in the embodiment shown and described herein, the light source 66 may comprise a light emitting diode. Depending on the type of light source that is used, it may be desirable or necessary to place a collimating lens 80 between the light source 66 and the aperture 80, as best seen in FIG. 5. The collimating lens 80 substantially collimates the light produced by the light source 66, thereby forming the first beam 20. Alternatively, the light source 66 may be provided with an integral collimating lens and/or mirror assembly (not shown), in which case the external collimating lens 80 may be omitted. Depending on the quality and precision of the lens (i.e., either collimating lens 80 or a lens integral to the light source 66) used to collimate the light produced by the light source 66, it may be desired to form the aperture 78 in body 30 as an elongate slot in order to further narrow and define the light so that it emerges from the aperture 78 as a fairly narrowly defined beam. See FIGS. 1 and 3.

The second feedback light beam 22 may be produced by an identical light source assembly 64' and may emerge from a second aperture 82 provided in the opposite end panel 38 the body 30. As was the case for the first beam 20, the second beam 22 should be generally aligned with the elongate opening 24 provided in the contact face 42 of body 30. Second beam 22 emerges from the end panel 38 and extends in a second (i.e., opposite) direction (indicated by arrow 82 in FIG. 4) along the transverse axis 26. The second feedback light beam 22 may also be inclined slightly downward (i.e., toward the object 14 being scanned), if necessary, so that the light beam 20 is incident on at least a portion of the object 14 during a scanning operation. See FIG. 4.

Figure 6:
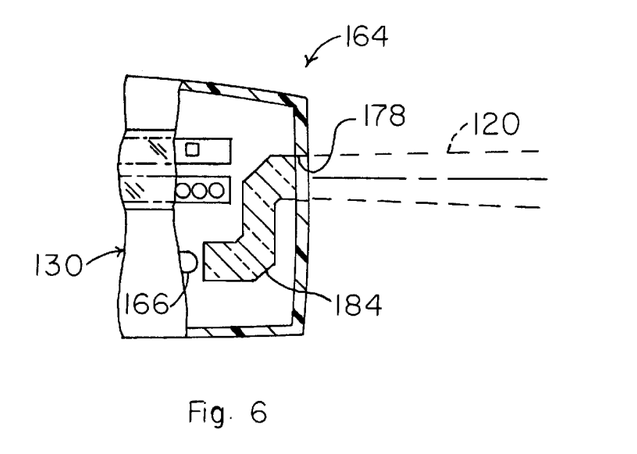
FIG. 6 is an enlarged plan view of a portion of the bottom face of the body of the scanner showing a second embodiment of a light source assembly for producing a feedback light beam.

As was mentioned above, the light source assemblies 64, 64' that may be used to produce the first and second light beams 20 and 22 may also comprise other configurations. For example, a second embodiment 164 of a light source assembly is shown in FIG. 6. The second embodiment 164 may be used to produce either or both of the feedback light beams (e.g., 20, 22) that emerge from either end panel of the scanner 16. The second embodiment 164 of the light source assembly may comprise a light pipe assembly 184 positioned between the light source 166 and the aperture 178 in body 130. The light pipe assembly 184 allows the light source 166 to be positioned at any convenient location within the body 130. Light pipe assembly 184 may comprise a transparent material (such as plastic or glass) and may be configured to transmit light by means of total internal reflection from the light source 166 to the aperture 178. Alternatively, optical fibers or filaments (not shown) may be used to direct light from the light source 166 to the aperture 178. However, since light pipes and/or optical fiber arrangements for transmitting light by means of total internal reflection are well-known in the art and could be easily provided by persons having ordinary skill in the art after having become familiar with the teachings of the present invention, the particular light pipe assembly 184 that may be utilized in one preferred embodiment of the present invention will not be described in further detail herein. Depending on whether the light source 166 is provided with an integral collimating lens, it may be necessary or desirable to position a collimating lens (not shown), such as a collimating lens 80 (FIG. 5) between the light source 166 and the light pipe assembly 184 or between the light pipe assembly 184 and the aperture 178 in order to collimate the light produced by the light source 166 so that it emerges from the aperture 178 as a fairly narrow, well-defined beam 120.

Figure 7:
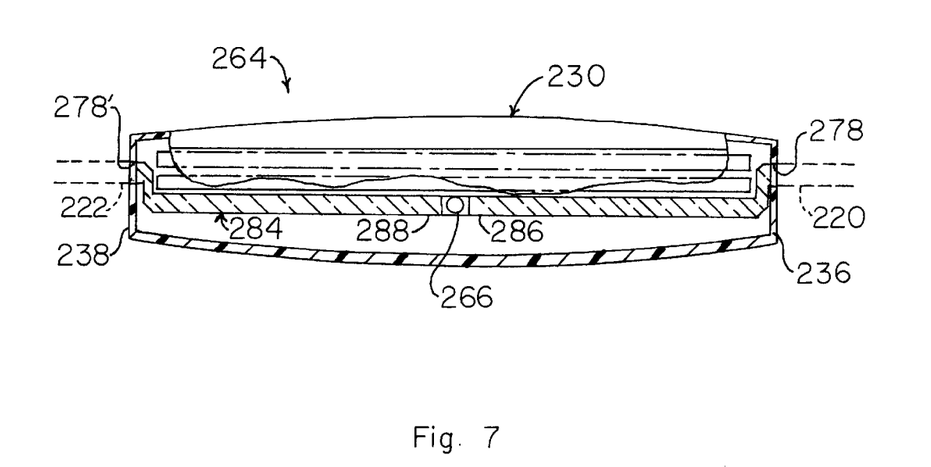
FIG. 7 is a plan view of the bottom face of the body of scanner showing a third embodiment of the light source assembly for producing the feedback light beams.

Still other arrangements are possible. For example, a third embodiment 264 of a light source assembly is illustrated in FIG. 7. The third embodiment of light source assembly 264 may comprise a single light source 266 which is optically coupled to the two apertures 278 and 278' located on the opposite end panels 236 and 238 of body 230 by a light pipe assembly 284. Light pipe assembly 284 conducts light from the light source 266 to each aperture 278, 278' by means of total internal reflection. Alternatively, the light pipe 284 may be formed from one or more optic fibers. Here again, since light pipes and/or fiber optic assemblies for transmitting light between two or more locations are well-known in the art and could be easily provided by persons having ordinary skill in the art after having become familiar with the teachings of the present invention, the light pipe assembly 284 that may be utilized in one preferred embodiment of the present invention will not be described in further detail herein.

Finally, and depending on whether the light source 266 is provided with an integral collimating lens, it may be necessary or desirable to position a pair of collimating lenses (not shown, but which may be similar to collimating lens 80 (FIG. 5)) between the light source 266 and each branch 286, 288 of light pipe assembly 284 in order to collimate the light produced by the light source 266 so that it emerges from the apertures 278 and 278' as fairly narrow, well-defined beams 220 and 222. Alternatively, such collimating lenses could be positioned between the ends of each branch 286, 288 of light pipe 284 and the respective apertures 278 and 278'.

Regardless of the particular configuration of the light source assembly 64, 164, or 264, that is used to produce the light beams (e.g., 20 and 22), the visual scan region position feedback system 10 may be operated as follows to assist a user (not shown) in scanning an object 14 with the scanner device 12. Assuming that the user has positioned the scanner apparatus 12 on the document 16 so that the scan head 42 contacts the document 16, the user may initiate the scan operation by activating the scan bar 62 provided on the back side 34 of scanner 16, and by thereafter moving the scanner 16 along the scanning path 56. As soon as the user activates the scan bar 62, a control system (not shown) provided in the scanner 16 activates the light source assemblies 64 to produce the first and second feedback light beams 20 and 22. As mentioned above, the two light beams 20 and 22 are generally aligned with the elongate opening 24, thus scan region 28, and extend outwardly from the body 30 in generally opposite directions (e.g., 76, 82, FIG. 4) along the transverse axis 26. Since the first and second light beams 20 and 22 are incident on at least portions of the object 14 being scanned, the light beams 20 and 22 provide the user with a ready visual reference of the general position of the scan region 28 with respect to the object 14. That is, the first and second light beams 20 and 22 provide the user with substantially continuous feedback regarding the location of the scan region 28 as the scanner is moved along the scanning path 56, thereby allowing the user to more easily scan the desired portions of the object 14.

It is contemplated that the inventive concepts herein described may be variously otherwise embodied and it is intended that the appended claims be construed to include alternative embodiments of the invention except insofar as limited by the prior art.

What is claimed is:

1. Scanner apparatus having a visual scan-region position feedback system, comprising:
    a body having at least one elongate opening therein that extends along a transverse axis, the elongate opening encompassing a scan region on an object during a scanning operation;
    an image sensing system mounted within said body and optically coupled to the elongate opening therein so that image light reflected by the scan region is incident on said image sensing system; and
    a first light source mounted to said body, said first light source producing a first light beam that is generally aligned with the elongate opening in said body and that extends in a first direction along the transverse axis, the first light beam being incident on at least a portion of the object being scanned during the scanning operation to provide a visual indication of a position of the scan region with respect to the object being scanned.

2. The scanner apparatus of claim 1, wherein said first light source is mounted within said body and wherein said body is provided with a first aperture therein, said first light beam passing through said first aperture.

3. The scanner apparatus of claim 2, further comprising a first lens positioned between said first light source and said first aperture, said first lens collimating light produced by said first light source to form said first light beam.

4. The scanner apparatus of claim 3, further comprising a first light pipe positioned between said first light source and said first lens.

5. The scanner apparatus of claim 3, wherein said first light source comprises a light emitting diode.

6. The scanner apparatus of claim 3, wherein said first light source comprises an incandescent lamp.

7. The scanner apparatus of claim 1, wherein said first light source produces a second light beam that is generally aligned with the elongate opening in said body and that extends in a second direction along the transverse axis, the second direction along the transverse axis being opposite the first direction along the transverse axis, the second light beam being incident on at least a portion of the object being scanned during the scanning operation.

8. The scanner apparatus of claim 7, wherein said body is provided with a second aperture therein, said second light beam passing through said second aperture.

9. The scanner apparatus of claim 8, further comprising a second lens positioned between said second aperture and said first light source, said second lens collimating light produced by said first light source to produce said second light beam.

10. The scanner apparatus of claim 9, further comprising a second light pipe positioned between said first light source and said second lens.

11. The scanner apparatus of claim 10, wherein the second light beam is produced by a second light source mounted adjacent said second light pipe.

12. Scanner apparatus having a visual scan-region position feedback system, comprising:
    a body having an elongate opening therein that extends along a transverse axis and that encompasses a scan region on an object during a scanning operation;
    an image sensing system mounted within said body and optically coupled to the elongate opening therein so that image light reflected by the scan region is incident on said image sensing system;
    a first light source mounted to said body, said first light source producing a first light beam that is generally aligned with the elongate opening in said body and that extends in a first direction along the transverse axis; and
    a second light source mounted to said body, said second light source producing a second light beam that is generally aligned with the elongate opening in said body and that extends in a second direction along the transverse axis, the second direction along the transverse axis being opposite the first direction along the transverse axis, the first and second light beams being incident on portions of the object being scanned during the scanning operation to provide a visual indication of a position of the scan region with respect to the object being scanned.

13. The scanner apparatus of claim 12, wherein said body includes a first end portion and a second end portion and wherein the first and second light beams extend outwardly from said first and second end portions of said body, respectively.

14. The scanner apparatus of claim 13, wherein the first end portion of said body includes a first aperture therein, said first light beam passing through said first aperture and wherein the second end portion of said body includes a second aperture therein, said second light beam passing through said second aperture.

15. The scanner apparatus of claim 14, further comprising a first lens positioned between said first light source and said first aperture, said first lens collimating light produced by said first light source.

16. The scanner apparatus of claim 15, further comprising a second lens positioned between said second light source and said second aperture, said second lens collimating light produced by said second light source.

17. The scanner apparatus of claim 16, further comprising a first light pipe positioned between said first light source and said first lens and a second light pipe positioned between said second light source and said second lens.

18. A method of scanning an object, comprising:

providing a scanner apparatus having an elongate opening therein that extends along a transverse direction;

placing said scanner apparatus in contact with at least a portion of the object to be scanned so that the elongate opening in the scanner apparatus encompasses a scan region; and generating a first light beam that is generally aligned with the elongate opening in the scanner apparatus and that extends along the transverse direction so that said first light beam is incident on at least a portion of the object being scanned to provide a visual indication of a position of the scan region with respect to the object being scanned.

19. The method of claim 18, further comprising generating a second light beam that is generally aligned with the elongate opening in the scanner apparatus and that extends along an opposite transverse direction as said first light beam so that said second light beam is also incident on at least a portion of the object being scanned, said first and second light beams being substantially aligned with the scan region.

20. Scanner apparatus having a visual scan-region position feedback system, comprising:

a body having an elongate opening therein that extends along a transverse axis, the elongate opening encompassing a scan region on an object during a scanning operation;

image sensing means mounted within said body means for receiving image light reflected by the scan region and for producing an image data signal related to the image light; and light source means for producing a light beam that is generally aligned with the elongate opening in said body and that extends along the transverse axis, the first light beam being incident on at least a portion of the object being scanned during the scanning operation to provide a visual indication of a position of the scan region with respect to the object being scanned.

* * * * *